United States Patent [19]

Delfosse et al.

[11] 4,013,602

[45] Mar. 22, 1977

[54] ULTRAFINE NATURAL CALCIUM CARBONATES AS FILLERS IN VARNISHES AND PAINTS

[75] Inventors: Pierre Delfosse, Paris, France; Alfred Bosshard, Oftringen, Switzerland

[73] Assignee: Pluss-Staufer AG, Oftringen, Switzerland

[22] Filed: Apr. 14, 1975

[21] Appl. No.: 567,963

Related U.S. Application Data

[63] Continuation of Ser. No. 401,498, Sept. 27, 1973, abandoned.

[30] Foreign Application Priority Data

Oct. 9, 1972  Germany .......................... 2251099
Feb. 26, 1973  Germany .......................... 2309517

[52] U.S. Cl. ............................ 260/22 R; 106/306; 260/17.4 R; 260/40 R
[51] Int. Cl.$^2$ ......................................... C08K 3/26
[58] Field of Search ........ 106/306; 260/40 R, 22 R, 260/17.4 R

[56] References Cited

UNITED STATES PATENTS 3,476,576  11/1969  Sennett et al. .................... 106/306

OTHER PUBLICATIONS

Parker, Principles of Surface Coating Technology, Interscience Pub., New York, 1965, pp. 81–84.

*Primary Examiner*—James H. Derrington
*Attorney, Agent, or Firm*—Pollock, Vande Sande & Priddy

[57] ABSTRACT

A varnish or paint containing ultrafine natural calcium carbonate as a filler, the carbonate having an average statistical particle diameter of from 0.5 to 0.7 $\mu$ and a maximum diameter of from 3 to 4 $\mu$.

13 Claims, No Drawings

ULTRAFINE NATURAL CALCIUM CARBONATES AS FILLERS IN VARNISHES AND PAINTS

This is a continuation of application Ser. No. 401,498, filed Sept. 27, 1973, now abandoned.

The main patent, German Patent Specification (Patent Application P 2251099.2) relates to a mill for grinding minerals which are used as pigments or fillers, said mill being characterised in that the grinding elements consist of 50 to 70% by weight of zirconium oxide, 0.1 to 5% by weight of aluminum oxide and 5 to 20% by weight of silicon oxide.

This mill enables ultrafine minerals to be prepared. For example, chalk from coccolith shells can be ground ultrafine.

Both dry grinding and wet grinding are familiar procedures for grinding mineral products such as chalk, crystalline calcium carbonate, dolomite, kaolin, lime, etc. which are used as pigments or mineral fillers. When the wet procedure is employed, grinding takes place either in horizontal-axis ball mills where the grinding elements generally take the form of grindstones of marine origin or steel balls, or in vertical-axis mills, so-called sand mills, or bead mills or quite generally in mills with microgrinding elements.

The sand mills which are used most widely of all consists of a cylindrical mill body having a vertical axis and a rotor with discs or crown wheels, the rotor simultaneously moving the grinding elements and the liquid suspension of the material being ground in the cylinder.

The liquid suspension of the material to be ground enters the mill at the bottom and is discharged at the top by overflowing.

The known grinding elements consist of sand, glass balls, steatite balls, molocite balls, steel balls or nylon balls.

The known grinding elements have the disadvantage that they wear quickly and contaminate the materials being ground, especially when very fine pigments or fillers of great whiteness and chemical purity are required. Another disadvantage of the known grinding elements consists in the fact that they are of low specific gravity and cannot be used, therefore, but for suspensions of comparatively low viscosity. In other words, for a given type of mill and glass balls, for example, the concentration of the solids is limited by the viscosity which cannot be exceeded.

An object of the invention of German patent application P 2251099.2 is, therefore, to provide a mill to grind minerals, which is able to produce pigments and fillers of great whiteness and purity and can handle suspensions of high viscosity.

This object is achieved in accordance with the invention of German patent application No. P 2251099.2 in that the grinding elements consist of 30–70% by weight zirconium oxide, 0.1–5% by weight aluminum oxide and 5–20% by weight silicon oxide.

Use is preferably made of ball mills having balls with a diameter of 0.5–10 cm, bead mills having balls with a diameter of 0.05–0.5 cm, yet preferably 0.1–0.25 cm, or sand mills.

The grinding elements used in accordance with the invention of German patent application P 2251099.2 have smooth surfaces. Apart from their great hardness and their resistance to abrasion, one of the most important properties of the grinding elements according to the invention is constituted by the specific gravity which ranges from 3.5 to 5 depending on the amount of zirconium oxide in them.

Thanks to the grinding elements according to the invention of German patent application No. P 2251099.2, it is even possible now to grind "soft" minerals (hardness 1 according to Mohs), especially chalk from coccolith shells and talc, in such a way that a specific surface greater than 12 $m^2/g$ is obtained; hitherto this has only been economically possible, if at all, with "hard" minerals such as Carrara marble.

Further advantages and features of the invention of German patent application No. P 2251099.2 can be seen from the following example:

A mill has filled with 920 kg of grinding elements in the form of balls according to the invention of German patent application No. P 2251099.2, having a diameter ranging from 1 to 2.5 mm.

The material for grinding consisted of an aqueous suspension of chalk with a concentration of 64% solids. The throughput amounted to 1000 liters/hour. A product with 95–98% of particles below 2 microns and a degree of whiteness of 95% Elrepho (blue filter) was obtained.

When the mill was operated under the same conditions and with the same type of chalk but with glass balls, the mill only managed a maximum fineness of 90% of particles below 2 microns and a degree of whiteness of only 93% Elrepho (blue filter).

In comparison with the use of glass balls as grinding elements, the specific surface of the finished product was found to have increased by 20–25%. It was also found that when glass balls were not used, the mill performed with satisfactory regularity and there was no vibration whatsoever at a constant ampere value.

Not only the increase in fineness but also substantially reduced contamination of the finished product explain why the degree of whiteness was increased by the use of the mill according to the invention. In fact, the wear on the balls used in accordance with the invention was substantially lower than that on the glass balls, as is demonstrated by the following comparison.

Balls used according to the invention of German patent application P 2251099.2: 0.3 kg/t of finished product; glass balls 1–1.3 kg/t of finished product.

Another advantage of the invention of German patent application No. P 2251099.2 consists in the fact that in contrast to the balls made of glass or other substances, the grinding elements based on zirconium oxide do not contain metals such as lead, manganese, copper, etc. which would cause the finished product to be contaminated.

Another advantage of the mill according to the invention of German patent application No. P 2251099.2 consists in the possibility of grinding aqueous solutions having much greater viscosities and hence much greater concentrations of solids than can be handled by other grinding element compositions; this results in a higher throughput for the same fineness. Owing to the high specific gravity of the grinding elements, the method according to the invention permits the concentration of solids in the product being around to be raised to 70% whereas the optimum concentration for glass balls, for example, is around 64% for the same degree of fineness.

Another advantage of the mill according to the invention of German patent application No. P 2251099.2 consists in the possibility of grinding substances of relatively high specific gravity such as barite or a series of lead salts.

The use of natural calcium carbonate as filler in varnishes and paints is already known. Since the finest natural calcium carbonates hitherto known have an average statistical particle diameter of 2 to 4 μ and a maximum of 10 to 20 μ, their usefulness in practice is restricted; in some fields, for example, in the production of brilliant covering varnishes, natural calcium carbonates are virtually not used at all.

It has already been proposed to use synthetic calcium carbonates or also other minerals obtained by precipitation or other suitable processes. These fillers have mainly the disadvantages of being usable only for special purposes, due to their comparatively complicated production, and of giving rise to a high consumption of binding agents due to their needle-shaped structure.

Calcium carbonates of various degrees of fineness and different origin have been tested in extensive series of experiments over many years for their usability as fillers in varnishes and paints. In further developing the invention of the main patent, Patent Application No. P 2251099.2 it has now been found that, surprisingly, ultrafine natural calcium carbonates with an average statistical particle diameter of 0.5 to 0.7 μ and an average maximum of 3 to 4 μ can be used as fillers in varnishes and paints.

Chalk from coccolith shells or crystalline calcite are particularly suitable natural calcium carbonates.

These calcium carbonates are primarily suitable as fillers in brilliant varnishes, dip primings, wall paper colours and inside emulsion paints.

Brilliant varnishes

Virtually no calcium carbonates are used for the production of brilliant covering varnishes, since the commercial products adversely affect the gloss and haze formation of these covering varnish systems. Extensive and elaborate tests have now shown that the ultrafine natural calcium carbonates of the invention can be used for the production of brilliant covering varnishes.

In the following Examples, commercial calcium carbonates are compared with the natural calcium carbonate of the invention (hereinafter referred to as product A) in a painter's varnish and a stoving varnish.

EXAMPLE 1

In a painter's varnish according to the recipe given below, a calcium carbonate with an average diameter of 4 μ and a maximum of 20 μ (product B) was compared with product A in respect of gloss and haze formation.

Test recipe:

| | |
|---|---|
| 500.0 p.b.w. | Plusol DL 75 hv, 80% in white spirit (alkyd 75% oil content |
| 280.0 p.b.w. | titanium dioxide, rutile |
| 5.0 p.b.w. | Texaphor (antisettling agent) (wetting agent) |
| 4.0 p.b.w. | Octa-Soligen Co, (6% octoate drier 6% cobalt) |
| 10.0 p.b.w. | Octa-Soligen Ca, (4% octoate drier, 4% calcium) |
| 8.4 p.b.w. | Octa-Soligen Pb, (24% octoate drier, 24% lead) |
| 10.0 p.b.w. | silicone oil A, 1% in toluene |
| 4.0 p.b.w. | Additol XL 297, (55% solution of an oxime antiskin agent) |
| 178.6 p.b.w. | white spirit |
| 1000.0 p.b.w. | |

The pigment concentration by volume amounted to 15.2%. 50% by volume of the titanium dioxide component were replaced with the products A and B, respectively. Due to this measure the pigment concentration by volume of the recipe remained unchanged.

Measuring of the gloss values and assessment of the haze formation were carried out after the coatings had been stored for four weeks. The results obtained are assembled in the following Table I Table I

| Pigment composition | | Gloss | Haze |
|---|---|---|---|
| 100% b. vol. | TiO$_2$ | 100% | nil |
| 50% b. vol. + 50% b. vol. | TiO$_2$ product A | 100% | nil |
| 50% b. vol. + 50% b. vol. | TiO$_2$ product B | 85% | very strong |

The comparative tests show that 50% by volume of the TiO$_2$ can be replaced in a painter's varnish with the calcium carbonate prepared according to the invention without giving rise to a loss of gloss or to haze formation. Moreover, the recipe with the use of product A is substantially more economical.

EXAMPLE 2

In a stoving varnish of the recipe given below, the product A was compared with a calcium carbonate with an average diameter of 2 μ and a maximum of 8 μ (product C). Again, 50% by volume of the titanium dioxide were replaced with the products A and C.

Test recipe:

| | |
|---|---|
| 500.0 p.b.w. | alkydal F 291, 60% in xylene (alkyd 21% oil content) |
| 160.0 p.b.w. | Mapranal NP, 55% (melamine curing agent) |
| 310.0 p.b.w. | titanium dioxide, rutile |
| 3.0 p.b.w. | Octa-Soligen Ca 4, liquid (4% octoate drier 4% calcium) |
| 4.0 p.b.w. | silicone oil A, 1% in toluene |
| 13.0 p.b.w. | butanol |
| 10.0 p.b.w. | Polysolvan 0 (butylester of glycolic acid) |
| 1000.0 p.b.w. | |

The pigment concentration by volume amounted to 16.4%.

Measuring of the gloss values and assessment of the haze formation were carried out after a stoving time of 30 minutes of 130° C. The results obtained are assembled in the following Table II.

Table II

| Pigment composition | | Gloss | Haze |
|---|---|---|---|
| 100% b.v. | TiO$_2$ | 100% | nil |
| 50% b.v. | TiO$_2$ | | |
| + 50% b.v. | product A | 100% | nil |
| 50% b.v. | TiO$_2$ | | |
| + 50% b.v. | product C | 92% | strong |

Also this test showed that the product A can be used in brilliant covering varnish without affecting the gloss or causing haze formation.

Dip primings

Dip primings are coating systems of particularly low viscosity, usually less than 20 sec. efflux time in a DIN 4 beaker. They have gained special importance as anti-corrosive primings in the automobile construction where complete casings and body parts are coated by dipping in suitably dimensioned vessels.

Only pigments and fillers with excellent suspension properties can be used for preparing these priming systems if sedimentation is to be effectively prevented. AT the same time the pigments and fillers must have a perfect and smooth film surface which does not require after-treatment by polishing or give rise to a gloss reduction of a covering varnish subsequently applied.

Extensive and elaborate tests have shown that the sedimentation of calcium carbonates can be obviated with the aid of the ultrafine natural calcium carbonates of the invention.

Combinations of the calcium carbonates prepared according to the invention with active pigments shown in dip primings an improved resistance of the films to corrosion, besides their outstanding suspension properties, and they are also more economical. The resultant films are characterised by perfect surfaces which, even if they are not polished, do not impair the gloss of a covering varnish subsequently applied and hence meet the demands for an economical varnishing process.

Wall paper colours

Natural calcium carbonates with an average statistical particle diameter of 2 to 4 $\mu$ and a maximum of 10 to 20 $\mu$ have hitherto been used for the production of wall paper colours. For wall paper colours of particularly high quality precipitated calcium carbonates have also already been used, as mentioned above.

By using the ultrafine natural calcium carbonates of the invention it has now become possible to obviate the use of precipitated calcium carbonates and to produce wall paper colours of higher covering power and improved printing properties. Moreover, the use of the calcium carbonates of the invention permits of a reduction of the proportion of titanium dioxide and thus of substantially more economical recipes, as can be seen from the following Examples.

EXAMPLE 3

In the following Table the product based on chalk and prepared according to the invention (product D) with an average particle diameter of 0.5 to 0.7$\mu$ and a maximum of 3 to 4 $\mu$ is compared with a commercial chalk (chalk E) with an average particle diameter of 2.5 $\mu$ and a maximum of 20 $\mu$ in respect of covering power.

Table III

| | Tristimulus green filter | | |
|---|---|---|---|
| | white | black | contrast ratio |
| product D | 98.5 | 83.2 | 84.5% |
| product E | 97.2 | 76.8 | 79.0% |

In addition to a substantially improved covering power, the product D prepared according to the invention shows a higher degree of whiteness (reflection value in a green filter over white ground). The use of product D for the production of wall paper colours therefore leads to a saving of white pigment and hence to a more economical recipe.

In order to attain the covering power of the product D prepared according to the invention, the chalk of the quality E must be combined with titanium dioxide in a proportion of 83 : 17. Calculating on the basis of market prices, a saving of over 40% is achieved with the product D compared with the combination product E titanium dioxide.

Inside emulsion paint

In an inside emulsion paint according to the recipe given below, the product based on chalk and prepared according to the invention (product D) was tested together with a normal chalk (product E) for optimal properties, the cost price being the same:

Recipe:

| | | |
|---|---|---|
| 384.0 p.b.w. | of pigment composition | |
| 80.0 p.b.w. | Durcal 5 (calcite extender) | |
| 49.0 p.b.w. | Buzges Iceberg (calcined clay) | |
| 76.0 p.b.w. | hydroxyethyl cellulose 2% | |
| 10.0 p.b.w. | Dowicil 100, 20% [preservative-1-(3-chloroallyl)-3,5,7-triazol-1-azoniaadamantane chloride] | |
| 1.0 p.b.w. | Dowicil S 13 [Fungicide-2,3,5,6-tetrachlor-4-(methylsulfonyl)-pyridine] | |
| 10.0 p.b.w. | sodium benzoate, 20% | |
| 13.0 p.b.w. | Orotan, 20% (disperant for aqueous systems) | |
| 2.0 p.b.w. | ammonia | |
| 2.0 p.b.w. | defoaming agent | |
| 29.0 p.b.w. | ethylene glycol | |
| 237.0 p.b.w. | dispersion (PVA/Veova), 50% | |
| 107.0 p.b.w. | water | |
| 1000.0 p.b.w. | | |

The pigment concentration by volume amounts to about 56%

The following pigment compositions were used:
| | | |
|---|---|---|
| (a) | 232.0 p.b.w. | product E |
| | 152.0 p.b.w. | titanium dioxide rutile |
| | 384.0 p.b.w. | |
| (b) | 252.0 p.b.w. | product D |
| | 132.0 p.b.w. | titanium dioxide rutile |

384.0 p.b.w.

The products D and E used for the preparation have the following characteristics:
product D: average particle diameter 0.5 to 0.7 μ, maximum 3 to 4 μ;
product E: average particle diameter 2.5 μ, maximum 20 μ.

| Degree of whiteness: | Tristimulus green filter |
|---|---|
| inside emulsion paint with product D | 84.5 |
| inside emulsion paint with product E | 82.5 |
| Covering power | Contrast ratio |
| inside emulsion paint with product D | 95% |
| inside emulsion paint with product E | 94% |

The test results show that a superior degree of whiteness and a higher covering power of the inside emulsion paint are achieved at the same cost price with the product D prepared according to the invention.

What we claim is:

1. A varnish or paint containing ultrafine natural calcium carbonate as a filler, the carbonate having an average statistical particle diameter of from 0.5 to 0.7 μ and a maximum diameter of from 3 to 4 μ.

2. A varnish or paint according to claim 1, in the form of a brilliant varnish or enamel, a dip primer, a wallpaper colouring or an interior emulsion paint.

3. A varnish or paint according to claim 1, wherein the carbonate is chalk from coccolith shells.

4. A varnish or paint according to claim 1, wherein the carbonate is crystalline calcite.

5. A varnish or paint according to claim 2 wherein the carbonate is chalk from coccolith shells.

6. A varnish or paint according to claim 2 wherein the carbonate is crystalline calcite.

7. The varnish of claim 1 which is a brilliant varnish or enamel.

8. The varnish of claim 1 which is a dip primer.

9. The varnish of claim 1 which is a wallpaper coloring.

10. The varnish of claim 1 which is an interior emulsion paint.

11. The paint of claim 1 which is a dip primer having a viscosity less than 20 seconds efflux time in a DIN 4 beaker.

12. The varnish of claim 1 which includes an alkyd as the binder.

13. The varnish of claim 1 which further includes $TiO_2$.

* * * * *